United States Patent
Nicolas et al.

(10) Patent No.: US 8,031,212 B2
(45) Date of Patent: *Oct. 4, 2011

(54) REORIENTING DISPLAY ON PORTABLE COMPUTING DEVICE

(75) Inventors: Regis Nicolas, Jacou (FR); Ronald Tessier, Montpellier (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/238,215

(22) Filed: Sep. 25, 2008

(65) Prior Publication Data
US 2009/0015597 A1    Jan. 15, 2009

Related U.S. Application Data

(63) Continuation of application No. 11/252,673, filed on Oct. 17, 2005, now abandoned, which is a continuation of application No. 09/575,493, filed on May 18, 2000, now Pat. No. 6,982,728.

(51) Int. Cl.
  *G06F 12/10*    (2006.01)
  *G09G 5/00*    (2006.01)
(52) U.S. Cl. ................ 345/659; 345/169; 345/2.1
(58) Field of Classification Search .......... 345/156, 345/654, 659, 168–169, 649, 694, 695, 1.1–1.3, 345/2.1–2.3, 3.4
See application file for complete search history.

(56) References Cited

U.S. PATENT DOCUMENTS

| | | | |
|---|---|---|---|
| 4,992,959 A | 2/1991 | Hamada et al. | |
| 5,276,794 A | 1/1994 | Lamb, Jr. | |
| 5,283,862 A | 2/1994 | Lund | |
| 5,432,720 A | 7/1995 | Lucente et al. | |
| 5,536,930 A | 7/1996 | Barkan et al. | |
| 5,566,098 A | 10/1996 | Sapper et al. | |
| 5,661,632 A * | 8/1997 | Register | 361/679.3 |
| 5,703,623 A | 12/1997 | Hall et al. | |
| 5,757,371 A | 5/1998 | Oran et al. | |
| 5,758,267 A | 5/1998 | Pinder et al. | |
| 5,825,675 A | 10/1998 | Want et al. | |
| 5,828,376 A | 10/1998 | Solimene et al. | |
| 5,936,619 A * | 8/1999 | Nagasaki et al. | 345/205 |
| 5,949,408 A | 9/1999 | Kang et al. | |
| 5,956,049 A | 9/1999 | Cheng | |
| 5,973,664 A | 10/1999 | Badger | |

(Continued)

FOREIGN PATENT DOCUMENTS

WO    WO 96/01453    1/1996

(Continued)

OTHER PUBLICATIONS

"Getting Started With Your PowerBook GF," pp. 1-2, 24, and 30-31, Copyright © 2002, Apple Computer, Inc., Cupertino, CA.

(Continued)

*Primary Examiner* — Duc Dinh

(57) ABSTRACT

An electronic system includes an electronic display device and a communication port. Each display mode corresponds to a particular position of the communication port relative to a line of sight of a user. In one embodiment, the communication port is an infrared communication port. Each display mode corresponds to a particular display orientation. The electronic display device displays visual data in the particular display orientation corresponding to the display mode of the electronic system. In one embodiment, the electronic system is a palmtop computer system such as a personal digital assistant.

19 Claims, 12 Drawing Sheets

U.S. PATENT DOCUMENTS

| | | | |
|---|---|---|---|
| 5,986,634 A | | 11/1999 | Alioshin et al. |
| 6,002,946 A * | | 12/1999 | Reber et al. ............ 455/557 |
| 6,009,336 A * | | 12/1999 | Harris et al. ............ 455/566 |
| 6,047,196 A | | 4/2000 | Mäkelä et al. |
| 6,069,623 A | | 5/2000 | Brooks |
| 6,115,025 A * | | 9/2000 | Buxton et al. ............ 345/659 |
| 6,148,325 A * | | 11/2000 | Schmidt et al. ............ 718/107 |
| 6,181,344 B1 | | 1/2001 | Eberhard et al. |
| 6,282,082 B1 | | 8/2001 | Armitage et al. |
| 6,297,795 B1 * | | 10/2001 | Kato et al. ............ 345/684 |
| 6,300,946 B1 | | 10/2001 | Hawkins et al. |
| 6,326,978 B1 * | | 12/2001 | Robbins ............ 345/654 |
| 6,342,830 B1 | | 1/2002 | Want et al. |
| 6,346,972 B1 | | 2/2002 | Kim |
| 6,348,928 B1 | | 2/2002 | Jeong |
| 6,373,501 B1 * | | 4/2002 | Fiero ............ 715/700 |
| 6,389,267 B1 | | 5/2002 | Imai |
| 6,404,420 B1 | | 6/2002 | Klein et al. |
| 6,418,325 B1 | | 7/2002 | Reber et al. |
| 6,433,791 B2 | | 8/2002 | Selli et al. |
| 6,453,173 B1 | | 9/2002 | Reber et al. |
| 6,473,883 B1 | | 10/2002 | Bobba et al. |
| 6,492,674 B1 | | 12/2002 | Komori |
| 6,493,464 B1 | | 12/2002 | Hawkins et al. |
| 6,597,384 B1 * | | 7/2003 | Harrison ............ 345/204 |
| 6,683,600 B1 | | 1/2004 | Lui |
| 6,704,007 B1 | | 3/2004 | Clapper |
| 6,888,532 B2 | | 5/2005 | Wong et al. |
| 6,952,203 B2 | | 10/2005 | Banerjee |
| 6,956,564 B1 | | 10/2005 | Williams |
| 7,159,194 B2 | | 1/2007 | Wong et al. |
| 7,256,767 B2 | | 8/2007 | Wong et al. |
| 2002/0021278 A1 | | 2/2002 | Hinckley et al. |
| 2002/0028696 A1 | | 3/2002 | Hirayama et al. |
| 2002/0033836 A1 | | 3/2002 | Smith |
| 2002/0044425 A1 | | 4/2002 | Ijas et al. |
| 2003/0038779 A1 | | 2/2003 | Baron et al. |
| 2003/0044000 A1 | | 3/2003 | Kfoury et al. |
| 2004/0036680 A1 | | 2/2004 | Davis et al. |
| 2007/0152963 A1 | | 7/2007 | Wong |
| 2007/0296693 A1 | | 12/2007 | Wong et al. |

FOREIGN PATENT DOCUMENTS

| | | |
|---|---|---|
| WO | WO 01/48587 | 7/2001 |

OTHER PUBLICATIONS

Apple Macintosh OS X version 4.6.1, released May 29, 2003, history of features, changes and bug fixes published on www.dragthing.com/english/history4.html, pp. 1-8 with enlargements of screenshots.

Apple Newton MessagePad User Manual pp. 14-17 and pp. 158-181 Copyright © 1997, Apple Computer, Inc., Cupertino, CA.

Apple Newton MessagePad User Manual pp. 35-37, 109-113, and 160-165, Copyright © 1997, Apple Computer, Inc., Cupertino, CA.

Non-final Office Action for U.S. Appl. No. 10/452, 233, mailed Feb. 6, 2007, 6 pages.

Non-final Office Action for U.S. Appl. No. 10/452,233, mailed Jul. 25, 2005, 13 pages.

"Dynamic Keyboard Display for Touch Screens", IBM Technical Disclosure Bulletin, vol. 35, No. 1B, Jun. 1, 1992, pp. 340-341.

"Mechanism for Dynamically Changing User Interface Default Choices," Javey, S Merks, EA Spall, RP, IBM Technical Disclosure Bulletin, IBM Corp., New York, US, vol. 37, No. 3, Mar. 1, 1994, pp. 445-446.

Final Office action for U.S. Appl. No. 10/452,232, mailed May 11, 2007, 11 pages.

Non-final Office action for U.S. Appl. No. 10/452,232, mailed Oct. 24, 2006, 8 pages.

* cited by examiner

REORIENTING DISPLAY ON PORTABLE COMPUTING DEVICE

CROSS-REFERENCE TO RELATED PATENT APPLICATIONS

This application is a Continuation of U.S. patent application Ser. No. 11/252,673, filed Oct. 17, 2005, which is a Continuation of U.S. Pat. No. 6,982,728, issued Jan. 3, 2006, both of which are hereby incorporated by reference in their entireties.

BACKGROUND

The present disclosure generally relates to the field of electronic systems having an electronic display device. More particularly, the present disclosure relates to the field of electronic systems having multiple display modes for displaying visual data in multiple display orientations on the electronic display device.

Computers and other electronic systems or devices (e.g., personal digital assistants) have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of a computer system or other type of electronic system or device is dramatically enhanced by coupling these stand-alone devices together in order to form a networking environment. Within a networking environment, users may readily exchange files, share information stored on a common database, pool resources, and communicate via electronic mail (e-mail) and via video teleconferencing. Furthermore, computers or other types of electronic devices which are coupled to the Internet provide their users access to data and information from all over the world.

The functionality of an electronic system (e.g., a palmtop computer system, a desktop computer system, a cellular phone, a pager, etc.) is enhanced by including an electronic display device. On occasion, the electronic system includes one or more communication ports for exchanging or sharing data with other electronic systems or with a network. For example, an infrared (IR) communication port, a radio communication port, or other type of communication port can be incorporated into the electronic system. A communication port is positioned in the electronic system according to a variety of factors, such as space requirements, industry standards, and convenience to a user.

A personal digital assistant (commonly referred to as a PDA) is a palmtop computer system. It is appreciated that the personal digital assistant is a portable hand-held device that is used as an electronic organizer which has the capability to store a wide range of information that includes daily appointments, numerous telephone numbers of business and personal acquaintances, and various other information. Moreover, the personal digital assistant can also access information from the Internet, as mentioned above. In particular, the personal digital assistant can browse Web pages located on the Internet. Typically, the personal digital assistant includes an electronic display device having a display area (e.g., a screen) that is smaller in size relative to a display area associated with a standard-sized electronic display device (e.g., 15 inch monitor, 17 inch monitor, etc.) which is part of a desktop computer system or a laptop computer system.

Typically, the personal digital assistant includes a communication port (e.g., an IR communication port, a radio communication port, a serial communication port for coupling to a communication cable, etc.). For example, a IR communication port is positioned along the top edge of the personal digital assistant so that a user can conveniently view and read the electronic display device and at the same time communicate with another electronic system located across from the user while the user holds the personal digital assistant.

FIG. 1 illustrates use of electronic systems 2a, 2b, and 2c to communicate via their respective communication ports. A first user 1a operates a first electronic system 2a. A second user 1b operates a second electronic system 2b. A third user 3a operates a third electronic system 3b. The second user 1b is located across from the first user 1a. The third user 1c is located adjacent to the first user 1a. As shown in FIG. 1, the electronic systems 2a, 2b, and 2b include a respective communication port 4a, 4b, and 4c and a respective electronic display device (first, second, and third electronic display devices 3a, 3b, and 3c). The communication port can be an infrared communication port, a radio communication port, a serial communication port for coupling to a communication cable or any other type of communication port. Generally, the communication port of one electronic system must be within a line of sight of the communication port another electronic system in order to establish a communication link between the electronic systems.

The first user 1a uses the first electronic system 2a to communicate with the second electronic system 2b via communication ports 4a and 4b. During the communication session, the line of sight 6a of the first user 1a is aligned with a reference display orientation 5a of the first electronic display device 2a. In addition, the line of sight 6b of the second user 1b is aligned with a reference display orientation 5b of the second electronic display device 2b. Similarly, the second user 1b and the third user 1c can communicate via communication ports 4b and 4c while maintaining an alignment between their respective line of sight 6b and 6c and their respective reference display orientation 5b and 5c.

Unfortunately, the first user 1a and the third user 1c cannot communicate via ports 4a and 4c and still maintain an alignment between their respective line of sight 6a and 6c and their respective reference display orientation 5a and 5c. Thus, the first user 1a and the third user 1c cannot conveniently view and read their respective electronic display devices 3a and 3c. Moreover, the first user 1a and the third user 1c cannot conveniently exchange data or play interactive games via their respective communication ports 4a and 4c while the first user 1a and the second user 1c are located adjacent to each other, such as when they are sitting side-by-side on a bench or on a couch.

One solution to maintaining alignment between line of sight and reference display orientation requires the location of communication ports at multiple locations on the electronic system, as illustrated by arrows 7a and 7c and arrows 8a and 8c. This solution is expensive. Moreover, the electronic system may not have sufficient space to support multiple communication ports.

SUMMARY

An electronic system having multiple display modes is described. The electronic includes an electronic display device and a communication port. Each display mode corresponds to a particular position of the communication port relative to a line of sight of a user. For example, the communication port can be to the right of the user's line of sight, can be to the left of the user's line of sight, or can be aligned with the user's line of sight. Moreover, one of the display modes corresponds to the user communicating via the communication port with another electronic system located in front of the user. Another of the display modes corresponds to the user communicating via the communication port with another electronic system located adjacent and to the right of the user. Still another of the display modes corresponds to the user communicating via the communication port with another electronic system located adjacent and to the left of the user. In one embodiment, the communication port is an infrared communication port. Each display mode corresponds to a particular display orientation. The electronic display device displays visual data in the particular display orientation corresponding to the display mode of the electronic system.

In one embodiment, the electronic system is a palmtop computer system such as a personal digital assistant. A user can selectively operate the electronic system in any one of the multiple display modes for communication with a second electronic system via the communication port. The user positions the electronic system such that the communication port is located in a position facilitating communication with the second electronic system via the communication port. The user selects a particular display mode such that to align the user's line of sight with the display orientation of the electronic display device.

In one embodiment, the electronic system includes one or more display mode controls for enabling the user to select a particular display mode. In a second embodiment, the electronic system includes a display re-orientation selector for enabling the user to select a particular display mode. The display re-orientation selector is implemented as a graphical button displayed on the electronic display device. Alternatively, the display re-orientation selector is implemented as a graphical menu element displayed on the electronic display device. Thus, the user can change a display orientation of the electronic display device so as to facilitate convenient viewing and reading of the electronic display device in a variety of situations requiring rotation of the electronic system to establish a communication link with the second electronic system via the communication port.

These and other advantages of the present invention will no doubt become apparent to those of ordinary skill in the art after having read the following detailed description of the preferred embodiments which are illustrated in the drawing figures.

In one embodiment, the present invention includes an electronic system capable of being rotated with respect to a line of sight of a user and further having a first display mode, a second display mode, and a third display mode, said electronic system comprising: a processor coupled to a bus; a memory device coupled to said bus; a communication port coupled to said bus, wherein each display mode depends on a position of said communication port relative to said line of sight of said user, wherein said position facilitates communication with a second electronic system via said communication port; one or more display mode controls for selectively operating said electronic system in one of said first, said second, and said third display modes, wherein a first display orientation corresponds to said first display mode, a second display orientation corresponds to said second display mode, and a third display orientation corresponds to said third display mode; and an electronic display device coupled to said bus, wherein said electronic display device is configured for displaying visual data in a display orientation corresponding to a selected display mode of said electronic system.

In another embodiment, the present invention includes an electronic system capable of being rotated with respect to a line of sight of a user and further having a first display mode, a second display mode, and a third display mode, said electronic system comprising: a processor coupled to a bus; a communication port coupled to said bus, wherein each display mode depends on a position of said communication port relative to said line of sight of said user, wherein said position facilitates communication with a second electronic system via said communication port; an electronic display device coupled to said bus, wherein a first display orientation corresponds to said first display mode, a second display orientation corresponds to said second display mode, and a third display orientation corresponds to said third display mode, wherein said electronic display device displays visual data in a display orientation corresponding to a selected display mode of said electronic system; and a memory device coupled to said bus and having computer-executable instructions for performing a method of selectively operating said electronic system in one of said first, said second, and said third display modes, the method comprising the steps of: a) displaying a display re-orientation selector for enabling said user to select one of said first, said second, and said third display modes; b) receiving a display mode selection from said user; and c) adjusting a particular display orientation of said electronic display device based on said display mode selection.

In still another embodiment, the present invention includes a portable electronic system capable of being rotated with respect to a line of sight of a user and further having a plurality of display modes, said portable electronic system comprising: a processor coupled to a bus; a memory device coupled to said bus; a communication port coupled to said bus, wherein each display mode corresponds to a display orientation of a plurality of display orientations; and an electronic display device coupled to said bus for displaying visual data according to a selected display orientation corresponding to a selected display mode of said portable electronic system, wherein each display mode depends on a position of said communication port relative to said line of sight of said user, wherein said position facilitates communication with a second electronic system via said communication port.

BRIEF DESCRIPTION OF THE DRAWINGS

The accompanying drawings, which are incorporated in and form a part of this specification, illustrate embodiments of the invention and, together with the description, serve to explain the principles of the present invention.

Figure 1:
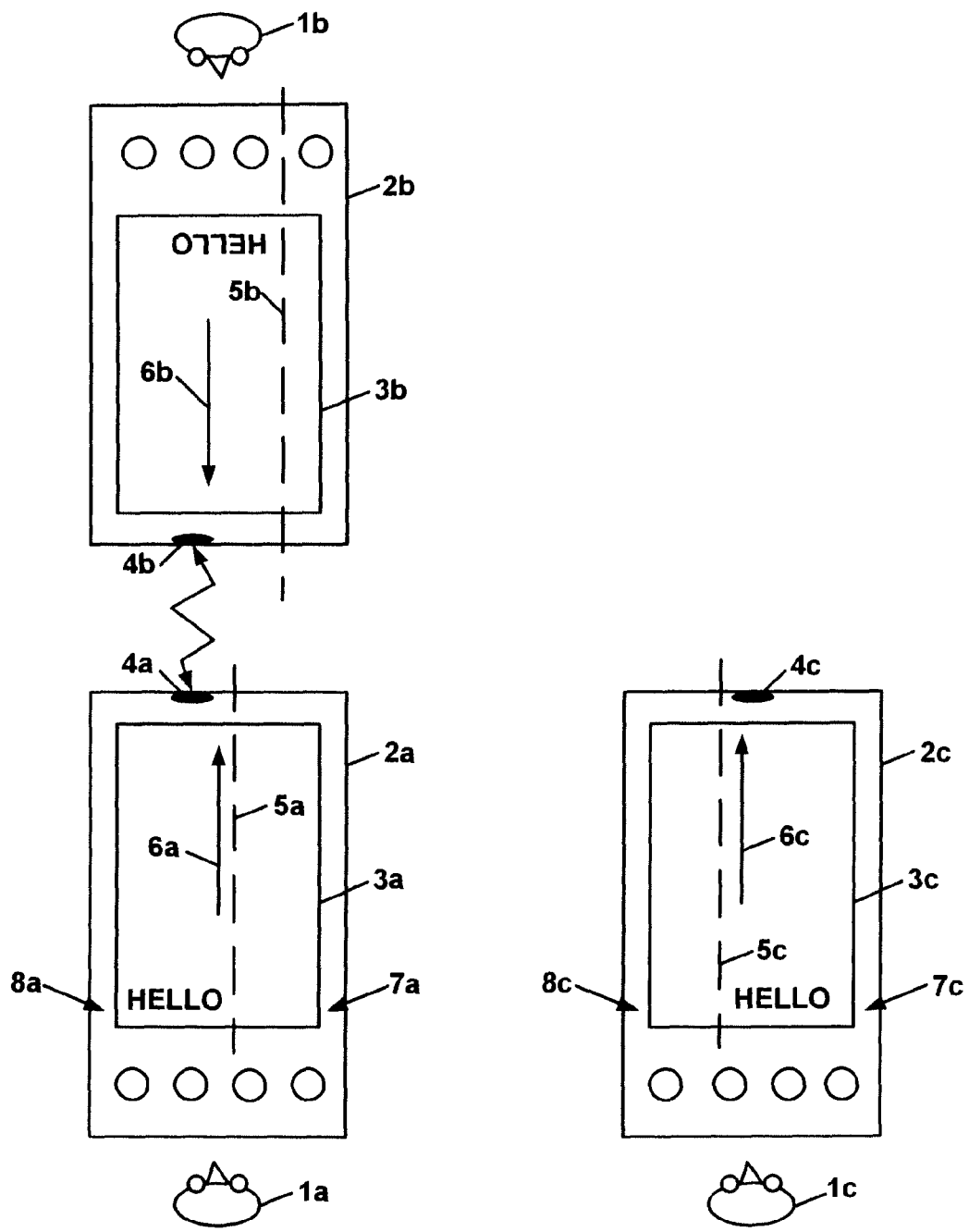
FIG. 1 illustrates use of electronic systems to communicate via their respective communication ports.

The drawings referred to in this description should not be understood as being drawn to scale except if specifically noted.

DETAILED DESCRIPTION OF THE PREFERRED EMBODIMENTS

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Although the description of the present invention will focus on an exemplary personal digital assistant or palmtop computer system, the present invention can be practiced with other electronic systems or electronic devices having an electronic display device (e.g., cellular phones, pagers, etc.).

NOTATION AND NOMENCLATURE

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating", "canceling", "assigning", "receiving", "forwarding", "dumping", "updating", "bypassing", "transmitting", "determining", "retrieving", "displaying", "identifying", "modifying", "processing", "preventing", "using", "sending", "adjusting" or the like, refer to the actions and processes of an electronic system or a computer system, or other electronic computing device/system such as a personal digital assistant (PDA), a cellular phone, a pager, etc. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Exemplary Electronic System Environment

One of the common types of electronic systems which can be used in accordance with one embodiment of the present invention is referred to as a personal digital assistant, or commonly called a PDA. The personal digital assistant is a pocket sized electronic organizer with the capability to store telephone numbers, addresses, daily appointments, and software that keeps track of business or personal data such as expenses, etc. Furthermore, the personal digital assistant also has the ability to connect to a personal computer, enabling the two devices to exchange updated information. Additionally, the personal digital assistant can also be connected to a modem, enabling it to have electronic mail (e-mail) capabilities over the Internet along with other Internet capabilities. Moreover, an advanced personal digital assistant can have Internet capabilities over a wireless communication interface (e.g., radio interface). In particular, the personal digital assistant can be used to browse Web pages located on the Internet. The personal digital assistant can be coupled to a networking environment. It should be appreciated that embodiments of the present invention are well suited to operate within a wide variety of electronic systems (e.g., computer systems) which can be communicatively coupled to a networking environment, including cellular phones, pagers, etc.

Figure 2A:
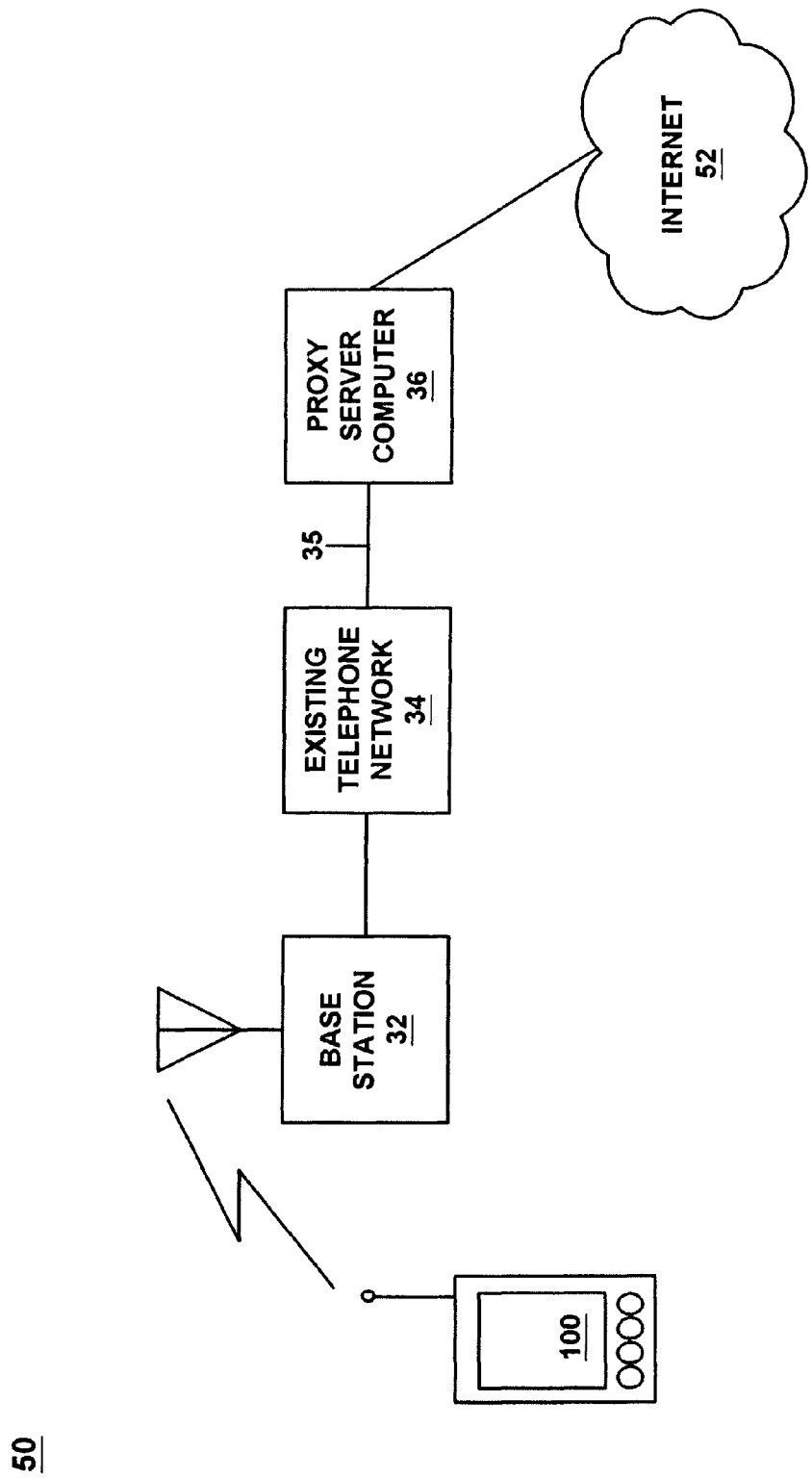
FIG. 2A illustrates a block diagram of a first exemplary network environment including a personal digital assistant in accordance with an embodiment of the present invention.

FIG. 2A is a block diagram of an exemplary network environment 50 including an exemplary portable electronic system 100 (e.g., a personal digital assistant). The personal digital assistant 100 is also known as a palmtop or palm-sized electronic system or computer system. The personal digital assistant 100 has the ability to transmit and receive data and information over a wireless communication interface (e.g., a radio interface). The personal digital assistant 100 is one exemplary implementation on which the present invention can operate. The present invention can operate on any portable electronic system/device having an electronic display device.

In one embodiment, base station 32 is both a transmitter and receiver base station which can be implemented by coupling it into an existing public telephone network 34. Implemented in this manner, base station 32 enables the personal digital assistant 100 to communicate with a proxy server computer system 36, which is coupled by wire 35 to the existing public telephone network 34. Furthermore, proxy server computer system 36 is coupled to the Internet 52, thereby enabling the personal digital assistant 100 to communicate with the Internet 52. It should be appreciated that within the present embodiment, one of the functions of proxy server 36 is to perform operations over the Internet 52 on behalf of the personal digital assistant 100. For example, proxy server 36 has a particular Internet address and acts as a proxy device for the personal digital assistant 100 over the Internet 52. It should be further appreciated that other embodiments of a communications network may be utilized in accordance with the present invention.

The data and information which are communicated between base station 32 and the personal digital assistant 100 are a type of information and data that can conventionally be transferred and received over a public telephone wire network system. However, a wireless communication interface is utilized to communicate data and information between the personal digital assistant 100 and base station 32. It should be appreciated that one embodiment of a wireless communication system in accordance with the present invention is the Mobitex wireless communication system.

Figure 2B:
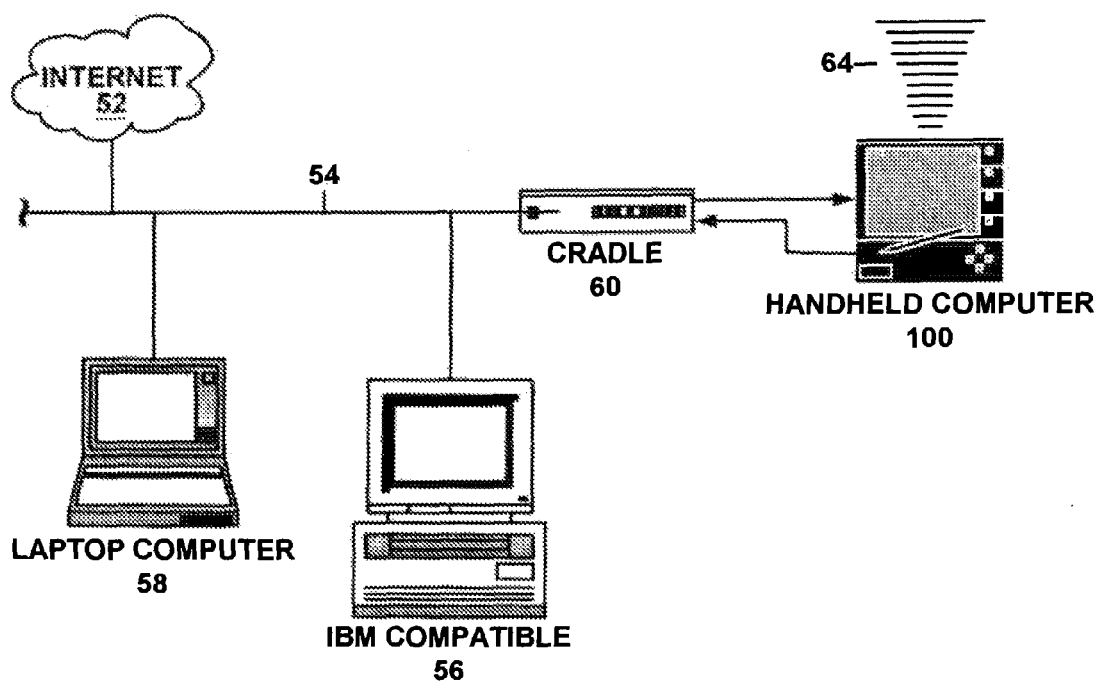
FIG. 2B illustrates a block diagram of a second exemplary network environment including a personal digital assistant coupled to other computer systems and the Internet via a cradle device in accordance with an embodiment of the present invention.

FIG. 2B illustrates another system 51. System 51 comprises a host computer system 56 which can either be a desktop computer system as shown, or, alternatively, can be a laptop computer system 58. Optionally, more than one host computer system 56 can be used within system 51. Host computer systems 58 and 56 are shown connected to a communication bus 54, which in one embodiment can be a serial communication bus, but could be of any of a number of well known designs (e.g., a parallel bus, Ethernet Local Area Network (LAN), etc.). Optionally, bus 54 can provide communication with the Internet 52 using a number of well known protocols.

Importantly, bus 54 is also coupled to a cradle 60 for receiving and initiating communication with the exemplary personal digital assistant 100. Cradle 60 provides an electrical and mechanical communication interface between bus 54 (and any device coupled to bus 54) and the personal digital assistant 100 for two-way communications. The personal digital assistant 100 also contains a wireless infrared communication mechanism 64 for sending and receiving information from other devices.

With reference to both FIGS. 2A and 2B, it is appreciated that the exemplary personal digital assistant 100 can be used in a network environment combining elements of networks 50 and 51. That is, as will be seen below, the personal digital assistant 100 can include both a wireless infrared communication mechanism and a signal (e.g., radio) receiver/transmitter device.

Figure 3:
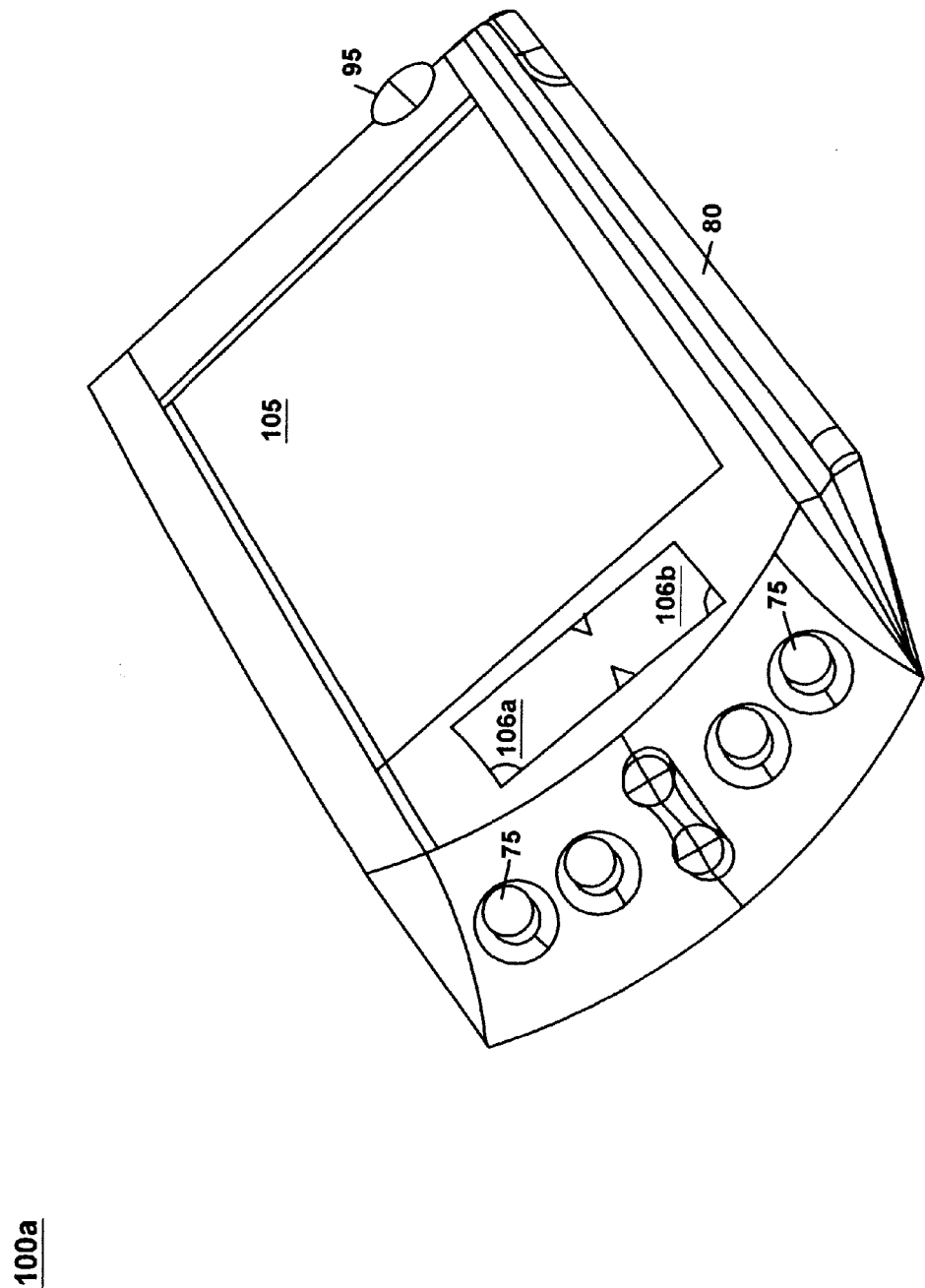
FIG. 3 illustrates a top side perspective view of a personal digital assistant that can be used as a platform for displaying Web pages in accordance with an embodiment of the present invention.

FIG. 3 is a perspective illustration of the top face 100*a* of one embodiment of the exemplary personal digital assistant or palmtop computer system 100. The top face 100*a* has a display screen 105 surrounded by a bezel or cover. A removable stylus 80 is also shown. The display screen 105 is a touch screen able to register contact between the screen and the tip of the stylus 80. The stylus 80 can be of any material to make contact with the display screen 105. The top face 100*a* also has one or more dedicated and/or programmable buttons 75 for selecting information and causing the computer system to implement functions. The on/off button 95 is also shown. Moreover, a user is able to control specific functionality of the personal digital assistant 100 by using its plurality of buttons 75 (e.g., to invoke telephone/address data, calendar data, to-do-list data, memo pad data, etc.). Furthermore, the user can utilize the stylus 80 in conjunction with the display screen 105 in order to cause the personal digital assistant 100 to perform a multitude of different functions. One such function is the selecting of different functional operations of the personal digital assistant 100, which are accomplished by touching stylus 80 to specific areas of display screen 105. Another such function is the entering of data into the exemplary personal digital assistant 100.

FIG. 3 also illustrates a handwriting recognition pad or "digitizer" containing two regions 106*a* and 106*b*. Region 106*a* is for the drawing of alphabetic characters therein (and not for numeric characters) for automatic recognition, and region 106*b* is for the drawing of numeric characters therein (and not for alphabetic characters) for automatic recognition. The stylus 80 is used for stroking a character within one of the regions 106*a* and 106*b*. The stroke information is then fed to an internal processor for automatic character recognition. Once characters are recognized, they are typically displayed on the screen 105 for verification and/or modification.

Figure 4:
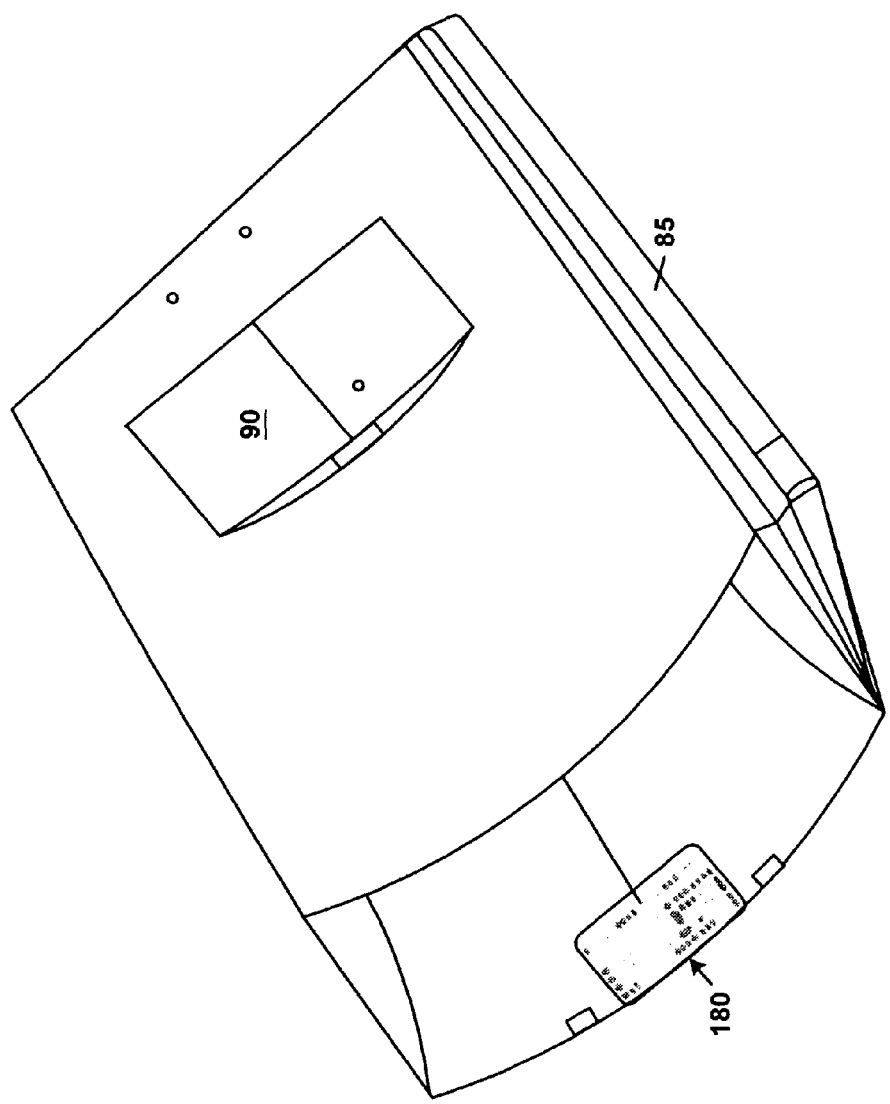
FIG. 4 illustrates a bottom side perspective view of the personal digital assistant of FIG. 3.

FIG. 4 illustrates the bottom side 100*b* of one embodiment of the exemplary personal digital assistant or palmtop computer system 100 that can be used in accordance with various embodiments of the present invention. An extendible antenna 85 is shown, and also a battery storage compartment door 90 is shown. The antenna 85 enables the exemplary personal digital assistant 100 to be communicatively coupled to a network environment (as shown in FIG. 2A) thereby enabling a user to communicate information with other electronic systems and electronic devices coupled to the network. A communication interface 180 is also shown. In one embodiment of the present invention, the communication interface 180 is a serial communication port, but could also alternatively be of any of a number of well-known communication standards and protocols (e.g., parallel, SCSI (small computer system interface), Firewire (IEEE 1394), Ethernet, etc.).

Figure 5:
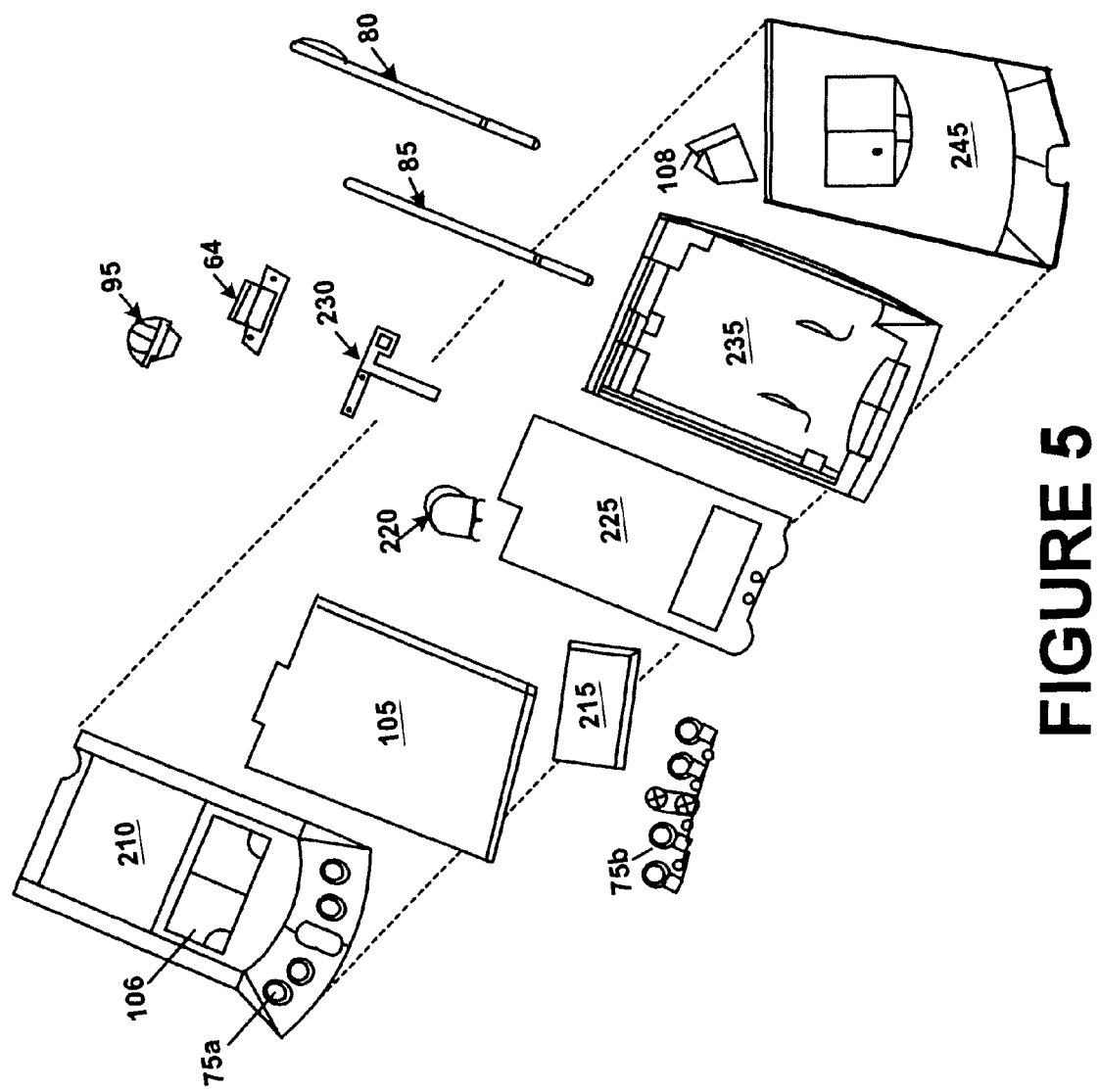
FIG. 5 illustrates an exploded view of the components of the personal digital assistant of FIG. 3.

FIG. 5 is an exploded view of the exemplary personal digital assistant 100. The personal digital assistant 100 contains a front cover 210 having an outline of region 106 and holes 75*a* for receiving buttons 75*b*. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown, as well as an on/off button 95. A flex circuit 230 is shown along with a personal computer (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown.

Infrared communication mechanism 64 (e.g., an infrared emitter and detector device) is for sending and receiving information from other similarly equipped devices (see FIG. 2B). A signal (e.g., radio) receiver/transmitter device 108 is also shown. The receiver/transmitter device 108 is coupled to the antenna 85 and also coupled to communicate with the PC board 225. In one implementation the Mobitex wireless communication system is used to provide two-way communication between the exemplary personal digital assistant 100 and other networked computers and/or the Internet via a proxy server (see FIG. 2A).

Figure 6:
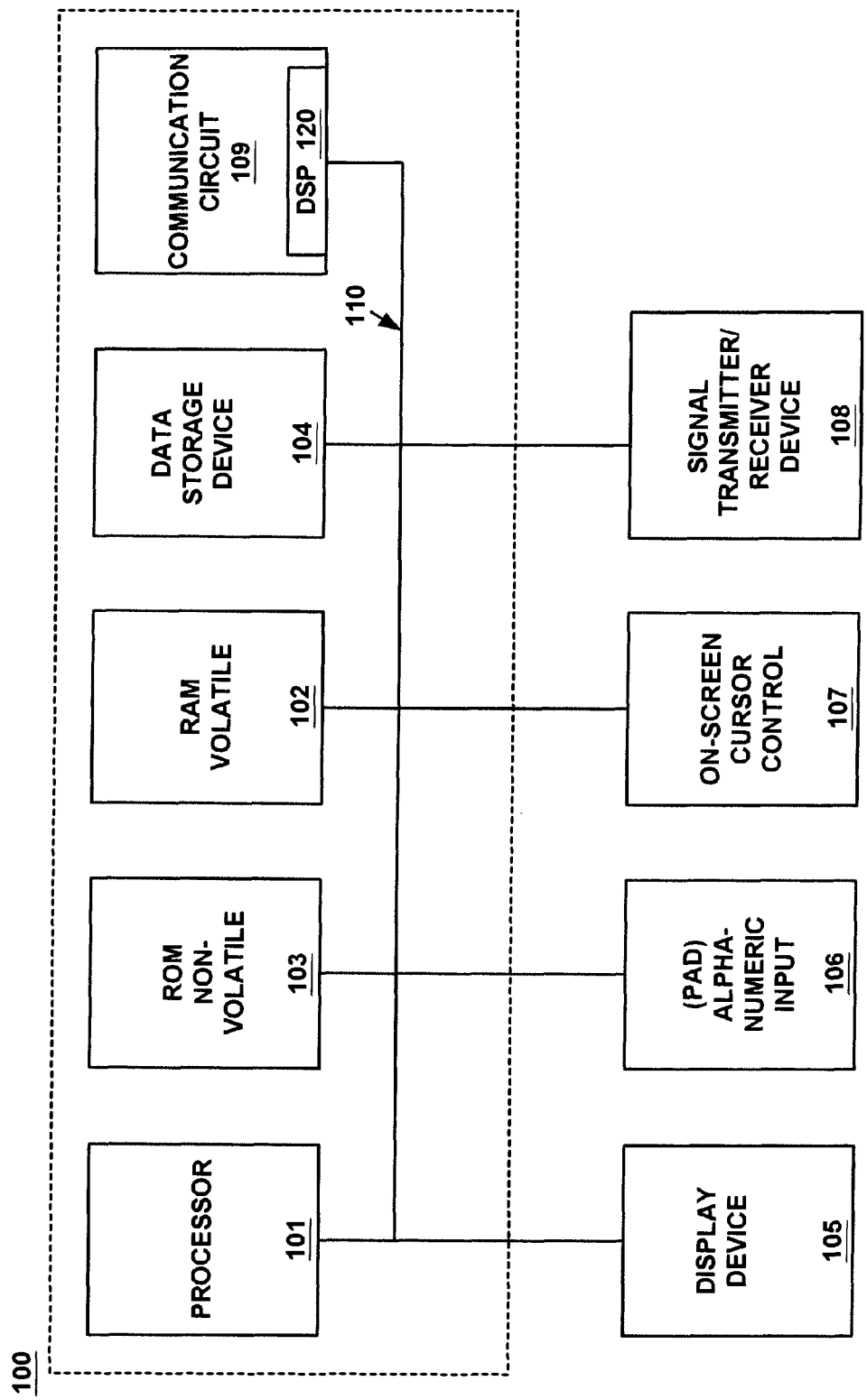
FIG. 6 illustrates is a logical circuit block diagram of the personal digital assistant in accordance with an embodiment of the present invention.

Referring now to FIG. 6, portions of the present electronic system are comprised of computer-readable and computer-executable instructions which reside, for example, in computer-readable media of an electronic system (e.g., personal digital assistant, computer system, and the like). FIG. 6 is a block diagram of exemplary interior components of an exemplary personal digital assistant 100 upon which embodiments of the present invention may be implemented. It is appreciated that the exemplary personal digital assistant 100 of FIG. 6 is only exemplary and that the present invention can operate within a number of different electronic systems including general purpose networked computer systems, embedded computer systems, and stand alone electronic systems such as a cellular telephone or a pager.

FIG. 6 illustrates circuitry of an exemplary electronic system or computer system 100 (such as the personal digital assistant), some of which can be implemented on PC board 225 (FIG. 5). Exemplary computer system 100 includes an address/data bus 110 for communicating information, a central processor 101 coupled to the bus 110 for processing information and instructions, a volatile memory 102 (e.g., random access memory, static RAM, dynamic RAM, etc.) coupled to the bus 110 for storing information and instructions for the central processor 101 and a non-volatile memory 103 (e.g., read only memory, programmable ROM, flash memory, EPROM, EEPROM, etc.) coupled to the bus 110 for storing static information and instructions for the processor 101. Exemplary computer system 100 also includes an optional data storage device 104 (e.g., memory card, hard drive, etc.) coupled with the bus 110 for storing information and instructions. Data storage device 104 can be removable. As described above, exemplary computer system 100 also includes an electronic display device 105 coupled to the bus 110 for displaying information to the computer user. In one embodiment, PC board 225 can include the processor 101, the bus 110, the ROM 103 and the RAM 102.

With reference still to FIG. 6, exemplary computer system 100 also includes a signal transmitter/receiver device 108 which is coupled to bus 110 for providing a communication link between computer system 100 and a network environment (e.g., network environments 50 and 51 of FIGS. 2A and 2B, respectively). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 5) and provides the functionality to transmit and receive information over a wireless communication interface. It should be further appreciated that the present embodiment of signal transmitter/receiver device 108 is well-suited to be implemented in a wide variety of ways. For example, signal transmitter/receiver device 108 could be implemented as a modem.

In one embodiment, exemplary computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, some or all of the functions performed by DSP 120 can be performed by processor 101.

Also included in exemplary computer system 100 of FIG. 6 is an optional alphanumeric input device 106 which in one implementation is a handwriting recognition pad ("digitizer") having regions 106a and 106b (FIG. 3), for instance. Alphanumeric input device 106 can communicate information and command selections to processor 101. Exemplary computer system 100 also includes an optional cursor control or directing device 107 (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with exemplary computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Figure 7:
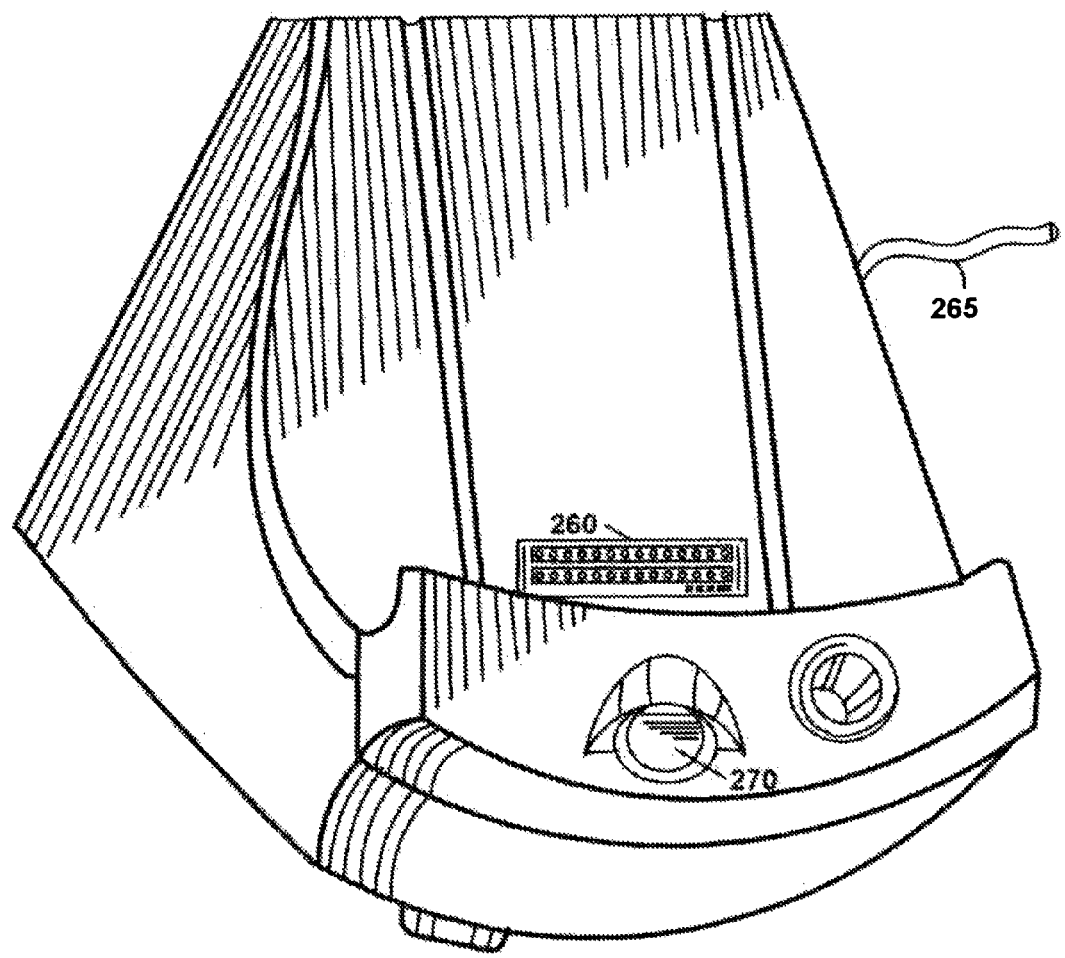
FIG. 7 illustrates a perspective view of the cradle device for connecting the personal digital assistant to other systems via a communication interface.

FIG. 7 is a perspective illustration of one embodiment of the cradle 60 for receiving the exemplary personal digital assistant or palmtop computer system 100. Cradle 60 includes a mechanical and electrical interface 260 for interfacing with communication interface 108 (FIG. 4) of the exemplary personal digital assistant 100 when the personal digital assistant 100 is slid into the cradle 60 in an upright position. Once inserted, button 270 can be pressed to initiate two-way communication between the personal digital assistant 100 and other computer systems or electronic devices coupled to serial communication 265.

Electronic System Operating in Multiple Display Modes

Although the description of the present invention will focus on an exemplary personal digital assistant or palmtop computer system, the present invention can be practiced with other electronic systems or electronic devices having an electronic display device (e.g., cellular phones, pagers, etc.).

Figure 8:
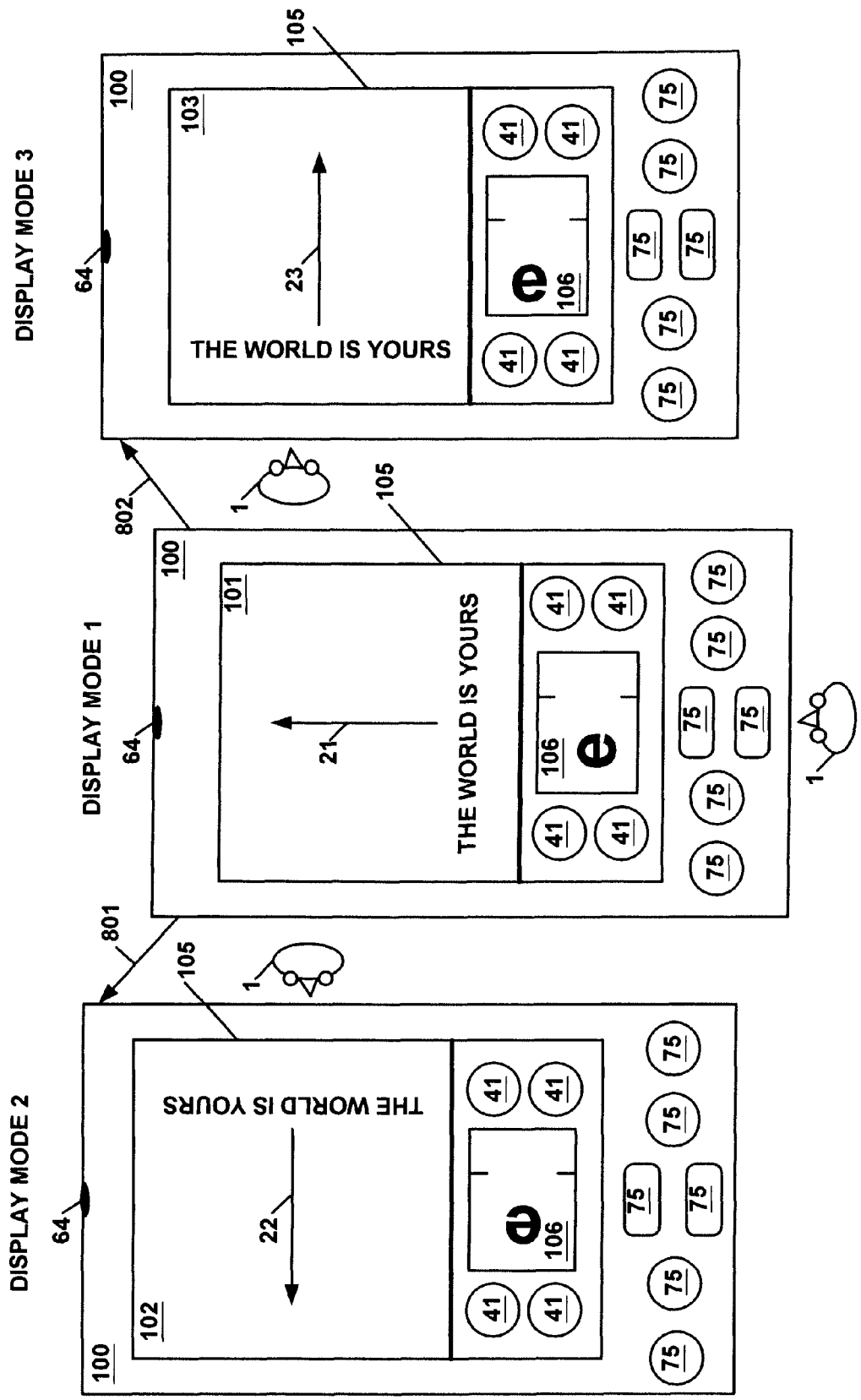
FIG. 8 illustrates a block diagram of selectively operating an electronic system in a particular display mode in accordance with an embodiment of the present invention.

FIG. 8 illustrates a block diagram of selectively operating an electronic system (e.g., an exemplary personal digital assistant 100) in a particular display mode in accordance with one embodiment of the present invention. As illustrated in FIG. 8, the personal digital assistant 100 has three display modes: a display mode 1, a display mode 2, and a display mode 3. Moreover, the personal digital assistant 100 can be implemented to have other number of display modes. For example, the personal digital assistant 100 can have more than three display modes or less than three display modes. A user can selectively operate the personal digital assistant 100 in any one of the display modes for facilitating communication with a second electronic system.

The personal digital assistant 100 includes an electronic display device 105. Additionally, the personal digital assistant 100 includes a plurality of function buttons 75 for selecting information and causing the personal digital assistant 100 to implement particular functions. The function buttons 75 can be selectively programmed to perform a particular function or can be preprogrammed for a particular function. The personal digital assistant 100 also includes a communication port 64 for communicating with a second electronic system. In one embodiment, the communication port is an infrared (IR) communication port 64. It should be recognized by one of ordinary skill in the art that the personal digital assistant 100 can be implement in a variety of other configurations. Moreover, it should be recognized by one of ordinary skill in the art that the components of the personal digital assistant 100 can be positioned in locations other than those illustrated in FIG. 8.

Each display mode corresponds to a particular position of the communication port relative to a line of sight 21, 22, and 23 of a user 1. In other words, the user 1 rotates the personal digital assistant 100 such that the communication port 64 is located in a position facilitating communication with a second electronic system via the communication port 64. For example, the communication port 64 can be to the right of the user's line of sight 22 (as in display mode 2), can be to the left of the user's line of sight 23 (as in display mode 3), or can be aligned with the user's line of sight 21 (as in display mode 1). Display mode 1 facilitates communication with a second electronic system located in front of the user 1. Display mode 2 facilitates communication with a second electronic system located adjacent and to the right of the user 1. Display mode 3 facilitates communication with a second electronic system located adjacent and to the left of the user 1. By selecting a particular display mode, the user 1 aligns his/her line of sight 21, 22, and 23 with the display orientation 101, 102, and 103 of the electronic display device 105. Hence, the user 1 is able to conveniently view and read the electronic display device 105 while exchanging information or playing interactive games with the second electronic system via the communication port 64.

In addition, the personal digital assistant 100 includes a handwriting recognition device 106. A stylus (not shown) is used for stroking a character within the handwriting recognition device 106. Also, the stylus is used to activate one of the plurality of short cut keys 41. Each short cut key 41 is programmed to perform a particular function.

As shown in FIG. 8, a particular display orientation corresponds to each display mode of the personal digital assistant 100. The electronic display device 105 displays visual data (e.g., the phrase "THE WORLD IS YOURS") in the particular display orientation corresponding to the display mode of the personal digital assistant 100. The orientation of the visual data changes according to the display mode of the personal digital assistant 100. If display orientation 101 corresponds to display mode 1, display orientation 102 corresponds to display mode 2, and display orientation 103 corresponds to display mode 3, display orientation 102 is offset positive 90 degrees relative to display orientation 1. Moreover, display orientation 103 is offset negative 90 degrees relative to display orientation 1. It should be recognized by one of ordinary skill in the art that display orientations 101, 102, and 103 are merely exemplary and that display orientations can be offset relative to one another in other proportions and degrees. Moreover, one of the display modes can be designated as a default display mode (e.g., display mode 1).

In addition, the personal digital assistant 100 configures the handwriting recognition device 106 according to the display mode. In display mode 1, the handwriting recognition device 106 is configured to receive from the user characters stroked in an orientation aligned with the display orientation 101. In display mode 2, the handwriting recognition device 106 is configured to receive from the user characters stroked in an orientation aligned with the display orientation 102. In display mode 3, the handwriting recognition device 106 is configured to receive from the user characters stroked in an orientation aligned with the display orientation 103.

As a result of the present invention, the user can select an appropriate display mode so that the display orientation facilitates convenient viewing and reading of the visual data on the electronic display device 105 in a variety of situations requiring rotation of the personal digital assistant 100 to establish a communication link with the second electronic system via the communication port 64.

In one embodiment, the personal digital assistant 100 includes one or more display mode controls for enabling the user to select a particular display mode. Here, the display mode controls are implemented as one or more of the function buttons 75. It should be recognized by one skilled in the art that the display mode controls can be implemented as switches or in any other appropriate manner. Alternatively, the personal digital assistant can include other buttons for implementing the display mode controls. Each display mode control can include a label indicating the display mode which can be activated with the particular display mode control. Moreover, it should be recognized by one of ordinary skill in the art that the display mode controls can be positioned in locations other than those illustrated in FIG. 8.

In practice, the user presses one of the function buttons 75 to change the display mode from display mode 1 to display mode 2, as shown by arrow 801. Once the function button is pressed, the personal digital assistant 100 adjusts the display orientation from display orientation 101 to display orientation 102. Moreover, the personal digital assistant 100 configures the handwriting recognition device 106 to receive user input handwriting stroke data oriented according to display mode 2. Thus, the user can use the stylus to stroke a character in an orientation aligned with the display orientation 102 on the handwriting recognition device 106. In one embodiment, the user can return to display mode 1 by pressing a function button 75 again or pressing another button corresponding to display mode 1. Alternatively, the user can return to display mode 1 in any other procedure/manner.

In practice, the user presses one of the function buttons 75 to change the display mode from display mode 1 to display mode 3, as shown by arrow 802. Once the function button 75 is pressed, the personal digital assistant 100 adjusts the display orientation from display orientation 101 to display orientation 103. Moreover, the personal digital assistant 100 configures the handwriting recognition device 106 to receive user input handwriting stroke data oriented according to display mode 3. Thus, the user can use the stylus to stroke a character in an orientation aligned with the display orientation 103 on the handwriting recognition device 106. In one embodiment, the user can return to display mode 1 by pressing a function button 75 again or pressing another button corresponding to display mode 1. Alternatively, the user can return to display mode 1 in any other procedure/manner.

In one embodiment, the personal digital assistant 100 adjusts the display orientation of the electronic display device 105 by implementing an operating system software module. Alternately, the personal digital assistant 100 adjusts the display orientation in conjunction with a hardware implementation within the personal digital assistant 100.

Figure 9:
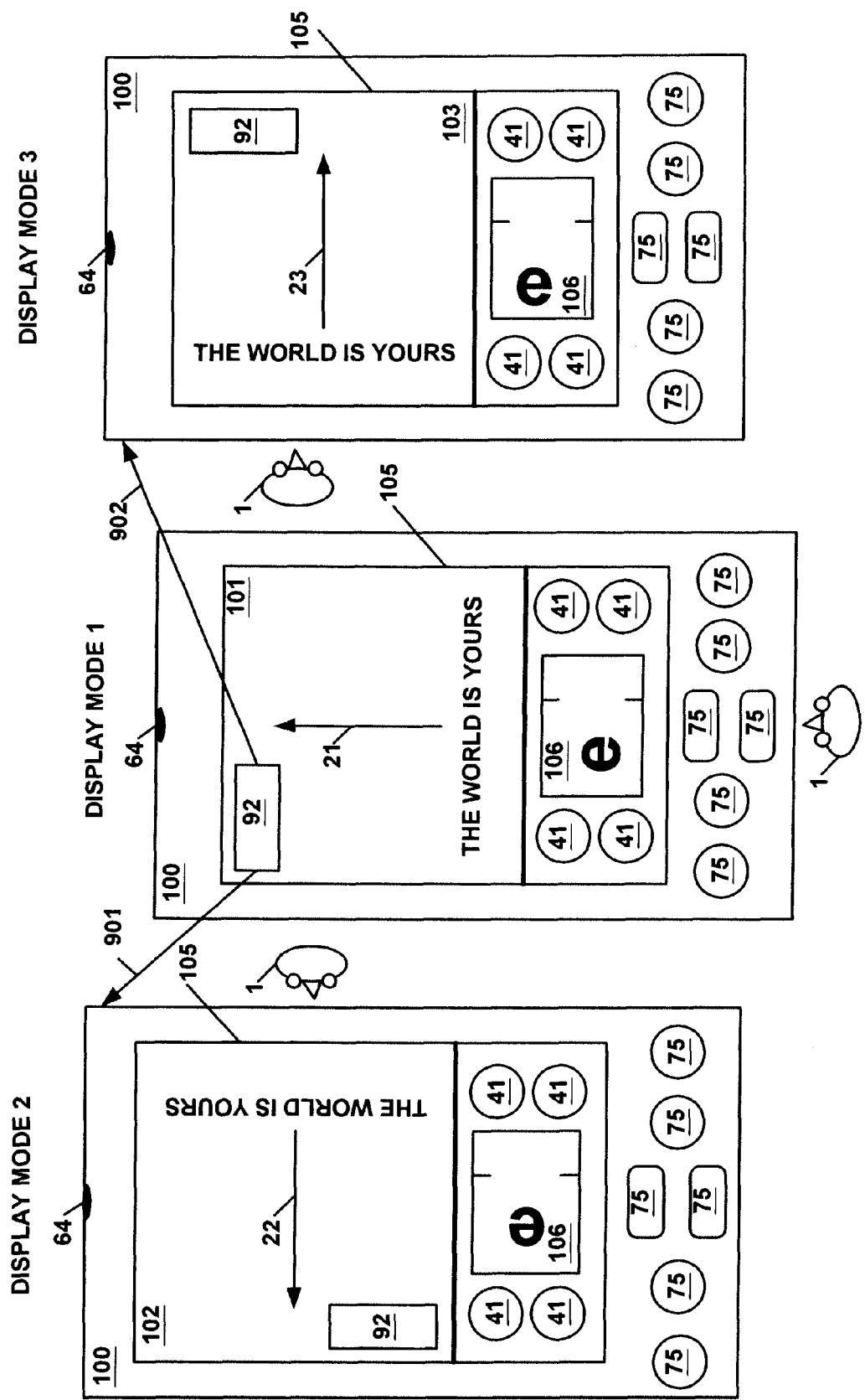
FIG. 9 illustrates a block diagram of selectively operating an electronic system in a particular display mode in accordance with another embodiment of the present invention.

FIG. 9 illustrates a block diagram of selectively operating an electronic system (e.g., an exemplary personal digital assistant 100) in a particular display mode in accordance with another embodiment of the present invention. As illustrated in FIG. 9, the personal digital assistant 100 has three display modes: a display mode 1, a display mode 2, and a display mode 3. Moreover, the personal digital assistant 100 can be implemented to have other number of display modes. For example, the personal digital assistant 100 can have more than three display modes or less than three display modes. A user can selectively operate the personal digital assistant 100 in any one of the display modes for facilitating communication with a second electronic system.

The personal digital assistant 100 includes an electronic display device 105. Additionally, the personal digital assistant 100 includes a plurality of function buttons 75 for selecting information and causing the personal digital assistant 100 to implement particular functions. The function buttons 75 can be selectively programmed to perform a particular function or can be preprogrammed for a particular function. The personal digital assistant 100 also includes a communication port 64. In one embodiment, the communication port 64 is an infrared (IR) communication port 64. It should be recognized by one of ordinary skill in the art that the personal digital assistant 100 can be implement in a variety of other configurations. Moreover, it should be recognized by one of ordinary skill in the art that the components of the personal digital assistant 100 can be positioned in locations other than those illustrated in FIG. 9.

Each display mode corresponds to a particular position of the communication port relative to a line of sight 21, 22, and 23 of a user 1. In other words, the user 1 rotates the personal digital assistant 100 such that the communication port 64 is located in a position facilitating communication with a second electronic system via the communication port 64. For example, the communication port 64 can be to the right of the user's line of sight 22 (as in display mode 2), can be to the left of the user's line of sight 23 (as in display mode 3), or can be aligned with the user's line of sight 21 (as in display mode 1). Display mode 1 facilitates communication with a second electronic system located in front of the user 1. Display mode 2 facilitates communication with a second electronic system located adjacent and to the right of the user 1. Display mode 3 facilitates communication with a second electronic system located adjacent and to the left of the user 1. By selecting a particular display mode, the user 1 aligns his/her line of sight 21, 22, and 23 with the display orientation 101, 102, and 103 of the electronic display device 105. Hence, the user 1 is able to conveniently view and read the electronic display device 105 while exchanging information or playing interactive games with the second electronic system via the communication port 64.

In addition, the personal digital assistant 100 includes a handwriting recognition device 106. A stylus (not shown) is used for stroking a character within the handwriting recognition device 106. Also, the stylus is used to activate one of the plurality of short cut keys 41. Each short cut key 41 is programmed to perform a particular function.

As shown in FIG. 9, a particular display orientation corresponds to each display mode of the personal digital assistant 100. The electronic display device 105 displays visual data (e.g., the phrase "THE WORLD IS YOURS") in the particular display orientation corresponding to the display mode of the personal digital assistant 100. The orientation of the visual data changes according to the display mode of the personal digital assistant 100. If display orientation 101 corresponds to display mode 1, display orientation 102 corresponds to display mode 2, and display orientation 103 corresponds to display mode 3, display orientation 102 is offset positive 90 degrees relative to display orientation 101. Moreover, display orientation 103 is offset negative 90 degrees relative to display orientation 101. It should be recognized by one of ordinary skill in the art that display orientations 101, 102, and 103 are merely exemplary and that display orientations can be offset relative to one another in other proportions and degrees. Moreover, one of the display modes can be designated as a default display mode (e.g., display mode 1).

In addition, the personal digital assistant 100 configures the handwriting recognition device 106 according to the display mode. In display mode 1, the handwriting recognition device 106 is configured to receive from the user characters stroked in an orientation aligned with the display orientation 101. In display mode 2, the handwriting recognition device 106 is configured to receive from the user characters stroked in an orientation aligned with the display orientation 102. In display mode 3, the handwriting recognition device 106 is configured to receive from the user characters stroked in an orientation aligned with the display orientation 103.

As a result of the present invention, the user can select an appropriate display mode so that the display orientation facilitates convenient viewing and reading of the visual data on the electronic display device 105 in a variety of situations requiring rotation of the personal digital assistant 100 to establish a communication link with the second electronic system via the communication port.

According to this embodiment (FIG. 9), the personal digital assistant 100 includes a display re-orientation selector 92 for enabling a user to select a particular display mode. Alternatively, the personal digital assistant 100 can include more than one display re-orientation selector 92. Here, the display re-orientation selector 92 is a graphical button 92 displayed on the electronic display device 105. Alternatively, the display re-orientation selector 92 is implemented as a graphical menu element displayed on the electronic display device 105. It should be recognized by one skilled in the art that the display re-orientation selector 92 can be implemented in any other appropriate manner. The display re-orientation selector 92 can include a label indicating the display mode or display modes which can be activated with the display re-orientation selector 92. Moreover, it should be recognized by one of ordinary skill in the art that the display re-orientation selector can be positioned in a location other than that illustrated in FIG. 9 and that the personal digital assistant 100 can include more than one display re-orientation selector 92.

In practice, the user selects the display re-orientation selector 92 to change the display mode from display mode 1 to display mode 2, as shown by arrow 901. The user can select the display re-orientation selector 92 by pressing a specific key (on a keyboard, a keypad, or a set of function buttons 75) which is associated with the display re-orientation selector 92, clicking a mouse while a cursor is positioned over the display re-orientation selector 92, pointing at the display re-orientation selector (on the electronic display device 105) with a stylus or pen, or in any other appropriate manner. In one embodiment, an application is invoked by selecting the display re-orientation selector 92. The application allows the user to select a desired display mode (e.g., display mode 2).

Once the user selects display mode 2, the personal digital assistant 100 adjusts the display orientation from display orientation 101 to display orientation 102. Moreover, the personal digital assistant 100 configures the handwriting recognition device 106 to receive user input handwriting stroke data oriented according to display mode 2. Thus, the user can use the stylus to stroke a character in an orientation aligned with the display orientation 102 on the handwriting recognition device 106. In one embodiment, the user can return to display mode 1 by selecting the display re-orientation selector 92.

In practice, the user selects the display re-orientation selector 92 to change the display mode from display mode 1 to display mode 3, as shown by arrow 902. The user can select the display re-orientation selector 92 by pressing a specific key (on a keyboard, a keypad, or a set of function buttons 75) which is associated with the display re-orientation selector 92, clicking a mouse while a cursor is positioned over the display re-orientation selector 92, pointing at the display re-orientation selector (on the electronic display device 105) with a stylus or pen, or in any other appropriate manner. In one embodiment, an application is invoked by selecting the display re-orientation selector 92. The application allows the user to select a desired display mode (e.g., display mode 3).

Once the user selects display mode 3, the personal digital assistant 100 adjusts the display orientation from display orientation 101 to display orientation 103. Moreover, the personal digital assistant 100 configures the handwriting recognition device 106 to receive user input handwriting stroke data oriented according to display mode 3. Thus, the user can use the stylus to stroke a character in an orientation aligned with the display orientation 103 on the handwriting recognition device 106. In one embodiment, the user can return to display mode 1 by selecting the display re-orientation selector 92.

In one embodiment, the personal digital assistant 100 adjusts the display orientation of the electronic display device 105 by implementing an operating system software module. Alternately, the personal digital assistant 100 adjusts the display orientation in conjunction with a hardware implementation within the personal digital assistant 100.

In another embodiment, a first user selects the display mode on a first personal digital assistant. The first personal digital assistant transmits via a communication port (e.g., an infrared communication port) appropriate display mode configuration instructions to a second personal digital assistant. The second personal digital assistant automatically configures itself to the appropriate display mode.

Figure 10:
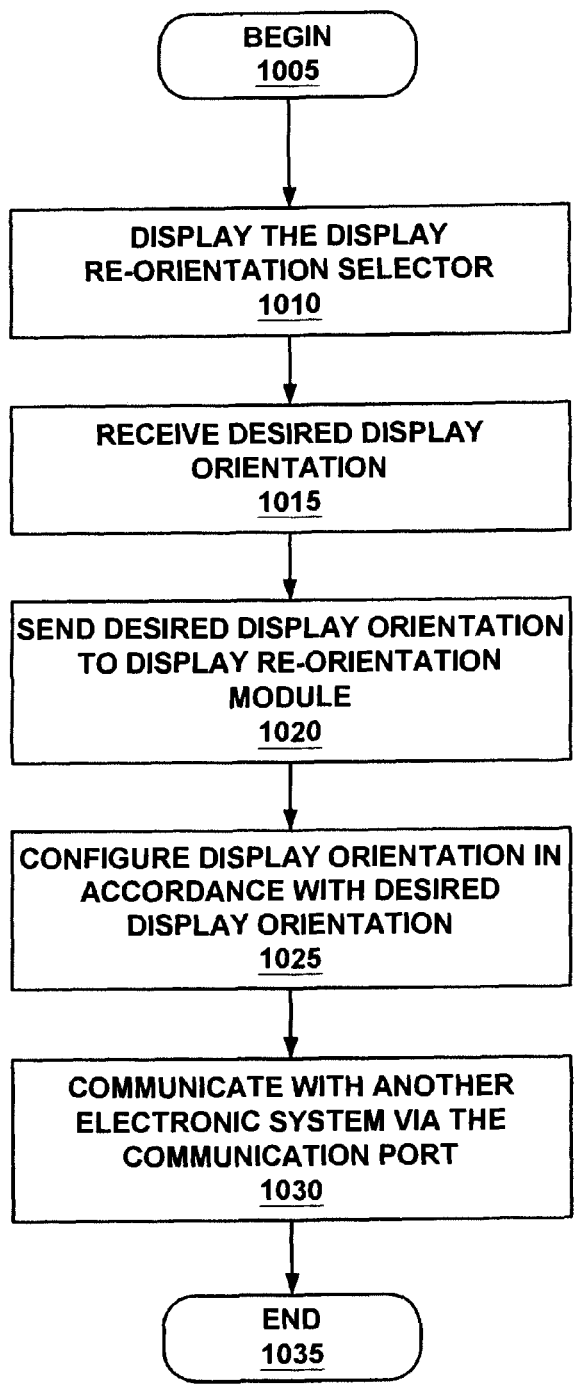
FIG. 10 illustrates a flow chart diagram of steps performed in accordance with one embodiment of the present invention for selectively operating an electronic system in a particular display mode.

Selectively Operating the Electronic System in a Particular Display Mode for Communication with a Second Electronic System Via a Communication Port FIG. 10 illustrates a flow chart diagram 1000 of steps performed in accordance with one embodiment of the present invention for selectively operating an electronic system (e.g., the exemplary personal digital assistant 100) in a particular display mode. Moreover, the present invention can be practiced with other electronic systems or electronic devices having an electronic display device (e.g., cellular phones, pagers, etc.).

At step 1005, the user positions the personal digital assistant 100 for a particular task (e.g., IR communication with another personal digital assistant via the communication port 64) and realizes that his/her line of sight is not aligned with the display orientation of the electronic display device 105.

At step 1010, the personal digital assistant 100 displays the display re-orientation selector 92 for enabling the user to select a desired display mode. At step 1015, the personal digital assistant 100 receives the user's desired display orientation or desired display mode (the user's selection).

At step 1020, the user's desired display orientation/desired display mode is sent to a display re-orientation module for changing the display orientation to the desired display orientation/desired display mode. The display re-orientation module can be implemented as a an operating system software module, a hardware module, or any other appropriate manner.

At step 1025, the display re-orientation module configures the display orientation according to the desired display orientation/desired display mode. At step 1030, the personal digital assistant 100 communicates with another electronic system via the communication port 64. At step 1035, this embodiment ends.

Figure 11:
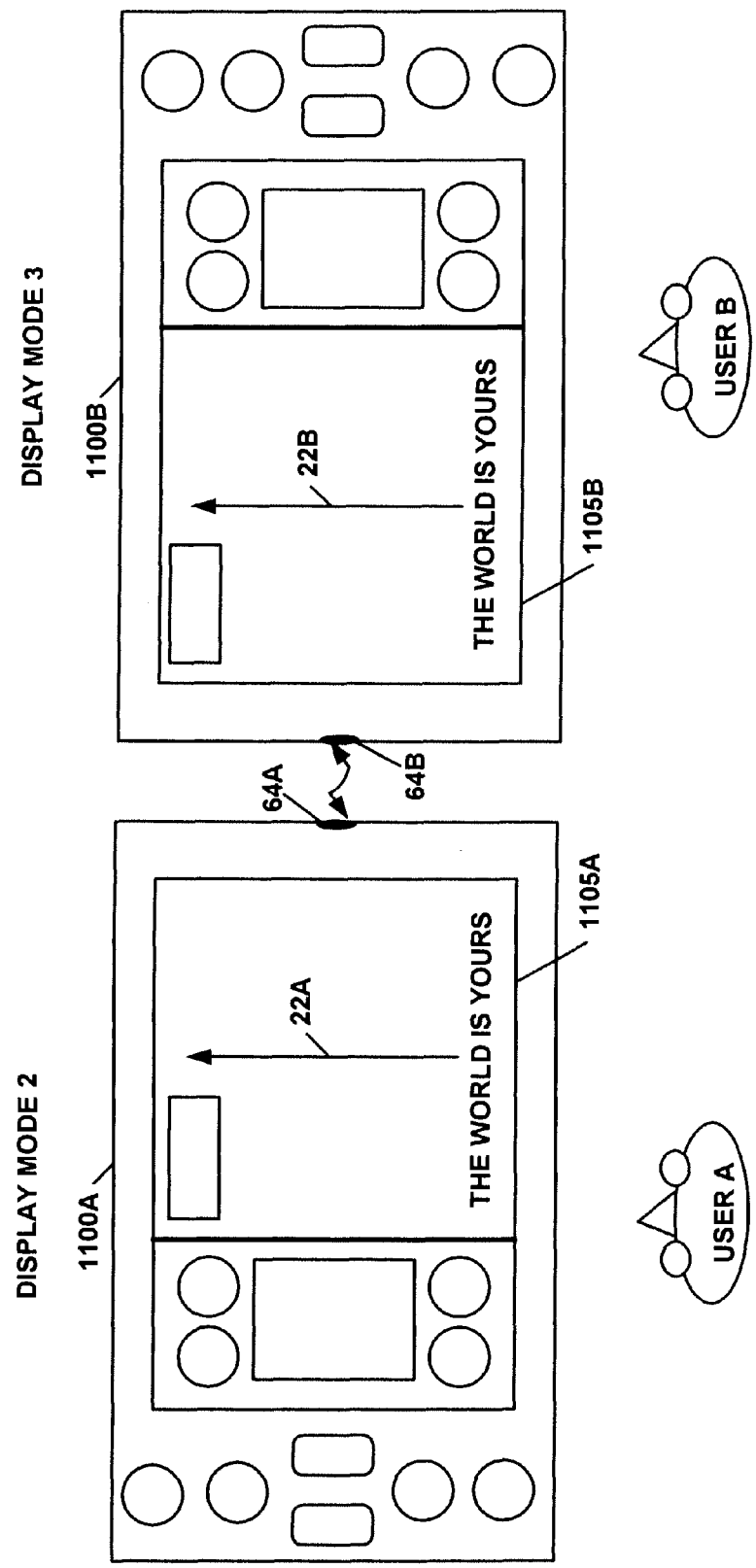
FIG. 11 illustrates an implementation of the present invention, showing a first electronic system and a second electronic system communicating via their respective communication ports.
Figure 7:
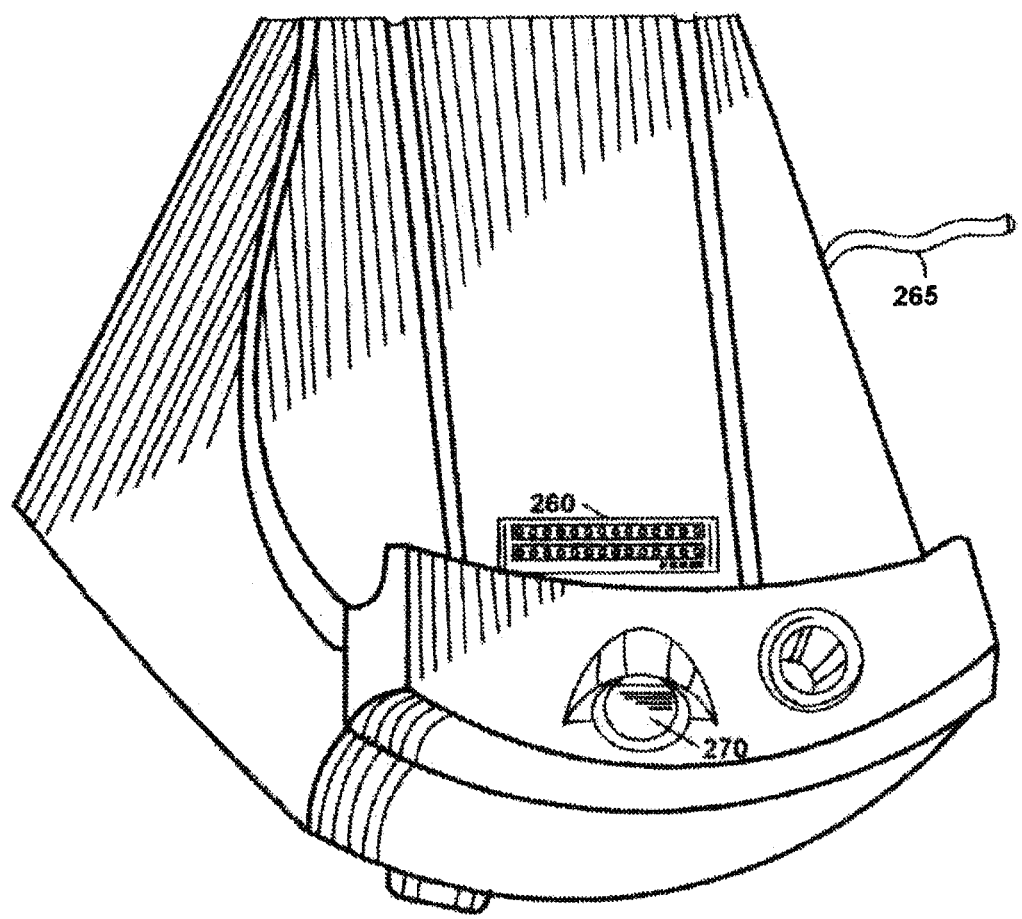

IR Communication Between a First Electronic System and a Second Electronic System Showing Multiple Display Modes FIG. 11 illustrates an implementation of the present invention, showing a first electronic system (a first personal digital assistant 1100A) and a second electronic system (a second personal digital assistant 1100B) communicating via their respective communication ports. User A operates the first personal digital assistant 1100A. User B operates the second personal digital assistant 1100B.

User A and user B as located adjacent to one another. Since user B is to the right of user A, user A has selected display mode 2 to align his/her line of sight 22A with the display orientation of the electronic display device 1105A. Since user A is to the left of user B, user B has selected display mode 3 to align his/her line of sight 22B with the display orientation of the electronic display device 1105B. Moreover, user A and user B can conveniently exchange data or play interactive games via their respective communication ports 64A and 64B while user A and user B are located adjacent to each other, such as when they are sitting side-by-side on a bench or on a couch.

Those skilled in the art will recognize that the present invention may be incorporated as computer instructions stored as computer program code on a computer-readable medium such as a magnetic disk, CD-ROM, and other media common in the art or that may yet be developed.

Finally, one of the embodiments of the present invention is an application, namely, a set of instructions (e.g., program code) which may, for example, be resident in the random access memory of an electronic system (e.g., computer system, personal digital assistant or palmtop computer system, etc.). Until required by the computer system, the set of instructions may be stored in another computer memory, for example, in a hard drive, or in a removable memory such as an optical disk (for eventual use in a CD-ROM) or floppy disk (for eventual use in a floppy disk drive), or downloaded via the Internet or other computer network. Thus, the present invention may be implemented as a computer program product for use in a computer system (e.g., personal digital assistant). In addition, although the various methods of the present invention described above are conveniently implemented in a computer system selectively activated or reconfigured by software, one of ordinary skill in the art would also recognize that such methods of the present invention may be carried out in hardware, firmware, or in a more specialized apparatus constructed to perform the required methods of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A portable electronic device, comprising:
    a portable housing configured to be held in a hand;
    a processing circuit configured to provide voice communication functionality and a plurality of personal digital assistant functions; a wireless communication interface coupled to the processing circuit configured to communicate with a network for at least one of the voice communication functionality and personal digital assistant functions; and
    a display, the processing circuit configured to adjust a display orientation of the display during use of a plurality of device functions, the plurality of device functions comprising an Internet browsing function,
    wherein adjusted display orientation information of the portable electronic device is transmitted to a second electronic device including a second display to automatically enable the configuration of a display orientation of the second display.

2. The portable electronic device of claim 1, further comprising a user input device, wherein the processing circuit is configured to adjust the display orientation based on a user input received from the user input device.

3. The portable electronic device of claim 2, wherein the user input device comprises a touch screen interface comprising a graphical element displayed on the display to receive the user input.

4. The portable electronic device of claim 3, wherein the graphical element comprises a label indicating a display orientation which can be activated with the graphical element.

5. The portable electronic device of claim 2, wherein the user input device comprises a key configured to receive the user input.

6. The portable electronic device of claim 5, wherein the key has a preprogrammed function other than display reorientation.

7. The portable electronic device of claim 1, wherein the device is configured to provide an Internet browser to the user via the display to browse web pages located on the Internet using the wireless communication interface.

8. The portable electronic device of claim 1, wherein the processing circuit is configured to provide an address data functionality, a calendar data functionality, and an electronic mail functionality.

9. The portable electronic device of claim 1, wherein the processing circuit comprises a general purpose networked computer system.

10. The portable electronic device of claim 1, wherein the processing circuit is configured to adjust the display orientation approximately 90 degrees based on a user input.

11. A portable electronic device, comprising:
a portable housing;
a processing circuit configured to provide voice communication functionality, email functionality and wireless internet browsing functionality;
a display that is fixed with respect to the portable housing; and
a user input device configured to receive a user input, wherein the processing circuit is configured to adjust a display orientation of the display approximately 90 degrees based on the user input during use of the wireless internet browsing functionality and adjusted display orientation information of the portable electronic device is transmitted to a second electronic device including a second display to automatically enable the configuration of a display orientation of the second display.

12. The portable electronic device of claim 11, wherein the user input device comprises a touch screen interface comprising a graphical element displayed on the display to receive the user input.

13. The portable electronic device of claim 12, wherein the processing circuit is configured to provide an address data functionality and a calendar data functionality.

14. The portable electronic device of claim 13, wherein the processing circuit is configured to wirelessly exchange updated information with a computer.

15. The portable electronic device of claim 14, wherein the processing circuit comprises a general purpose networked computer system.

16. A method, comprising:
determining an orientation of a portable computing device configured to provide voice communication functionality and a plurality of personal digital assistant functions;
changing an orientation of images on a display of the portable computing device to correspond to the orientation of the portable computing device during use of a plurality of device functions, the plurality of device functions comprising an Internet browsing function; and
transmitting the changed orientation information of images of the portable electronic device to a second electronic device including a second display to automatically enable the configuration of a display orientation of the second display,
wherein an orientation of the display with respect to an orientation of a housing of the portable computing device remains fixed when changing the orientation of images on the display.

17. The method of claim 16, further comprising: receiving an input from a user input device, wherein the orientation of images on the display is changed based on the input from the user input device.

18. The method of claim 16, further comprising: receiving a signal from a second portable computing device, wherein the orientation of images on the display is changed based on the signal from the second portable computing device.

19. The method of claim 16, further comprising providing wireless internet browsing functionality.

* * * * *

UNITED STATES PATENT AND TRADEMARK OFFICE
CERTIFICATE OF CORRECTION

| | | |
|---|---|---|
| PATENT NO. | : 8,031,212 B2 | Page 1 of 2 |
| APPLICATION NO. | : 12/238215 | |
| DATED | : October 4, 2011 | |
| INVENTOR(S) | : Regis Nicolas et al. | |

It is certified that error appears in the above-identified patent and that said Letters Patent is hereby corrected as shown below:

Delete Drawing Sheet 8 of 12 and substitute therefore the attached Drawing Sheet 8 of 12. --60-- has been inserted above reference numeral "265".

Signed and Sealed this
Fifth Day of June, 2012

David J. Kappos
*Director of the United States Patent and Trademark Office*